(No Model.)
A. C. COOK.
VEGETABLE SLICING MACHINE.
No. 524,575. Patented Aug. 14, 1894.
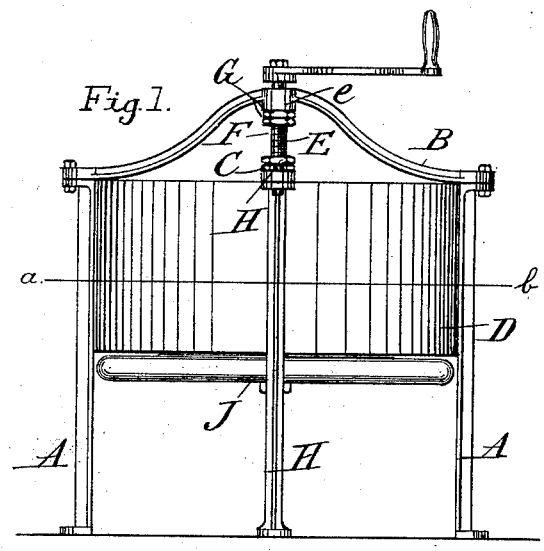
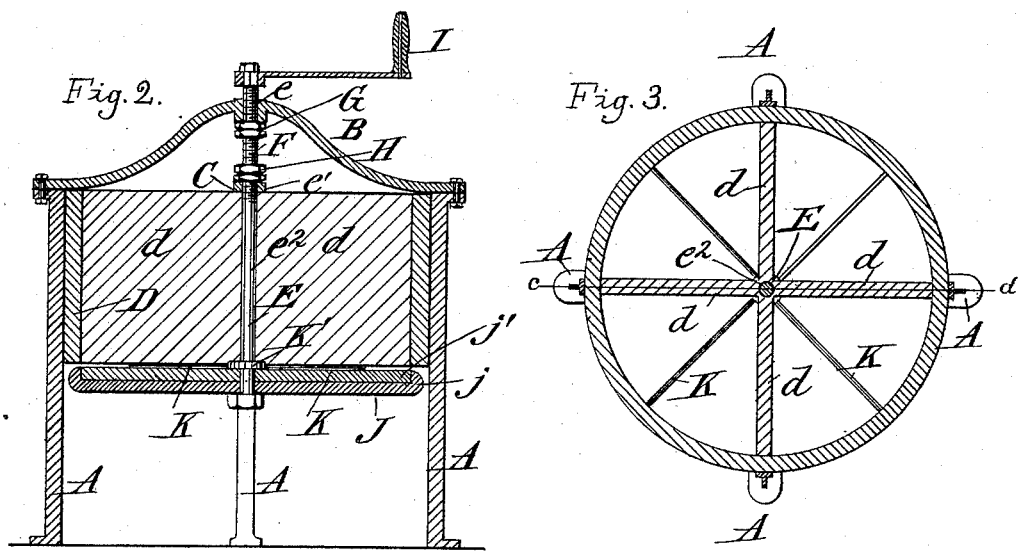
Witnesses
F. D. McCleary
F. H. Schott
Inventor
Annie C. Cook
By her Attorney
W. A. Ruff

UNITED STATES PATENT OFFICE.

ANNIE C. COOK, OF COUNCIL BLUFFS, IOWA.

VEGETABLE-SLICING MACHINE.

SPECIFICATION forming part of Letters Patent No. 524,575, dated August 14, 1894.

Application filed April 30, 1894. Serial No. 509,571. (No model.)

*To all whom it may concern:*

Be it known that I, ANNIE C. COOK, residing at Council Bluffs, in the county of Pottawattamie and State of Iowa, have invented certain new and useful Improvements in Vegetable-Slicing Machines; and I do hereby declare the following to be a full, clear, and exact description of the invention, such as will enable others skilled in the art to which it appertains to make and use the same.

My invention relates to an improvement in vegetable cutters, the object being to provide a cutter capable of vertical adjustments to regulate the thickness of the slices to be cut from the vegetables, and to afford efficient means for preventing the rotation of the material being operated upon during the revolution of the slicing knives.

The invention consists in the features of construction hereinafter fully described and particularly defined in the appended claims.

In the accompanying drawings, Figure 1 is a side elevation of a machine embodying my invention. Fig. 2 is a vertical section on the line $c$—$d$, of Fig. 3; and Fig. 3 is a horizontal section on the line $a$—$b$ of Fig. 1.

The frame of the machine comprises legs A and cross-bars B and C, said cross-bars being arranged at right angles to each other and secured to the upper ends of the legs as shown.

D indicates a circular tank or receptacle supported by the legs A, and open at top and bottom, as shown. The tank is provided with a series of radial partitions $d$, which serve to limit the rotary movement of the receptacles as will be further explained.

A central shaft E is supported in bearings $e$, $e'$ formed in the cross-bar, and passes through a vertical opening $e^2$ at the junction of the partition $d$. The upper portion F of the shaft E is screwthreaded from its upper end to a point below the cross bar C and upon this threaded part of the shaft are arranged adjusting nuts G and H.

A crank handle I is secured to the upper end of the shaft E. The lower end of this shaft supports a rotary platform consisting of a metallic circular frame J, formed with an annular edge flange $j$, and a wooden disk $j'$, provided with radial grooves, within which are seated suitable slicing knives K. An annular collar K' on the shaft E aids in supporting the rotary platform.

The knives K may be provided with suitable adjusting means, (not shown.)

The operation of the machine is as follows: The vegetables to be sliced are placed in the stationary tank or tub D, through which they fall upon the rotary platform bearing the cutting knives. The rotation of the shaft and platform by means of the crank I, operates to slice the vegetables, the slices escaping below the tank D. The nuts G and H permit the vertical adjustment of the platform, and the thickness of the slices to be cut is regulated by the adjustment of the radial cutters.

The radial partitions $d$ prevent the vegetables contained in the tank from rotating with the movement of the rotary platform.

The threads on the shaft E are preferably square threads, to avoid undue wear.

Having thus described my invention, what I claim as new, and desire to secure by Letters Patent, is—

1. The combination with the supporting legs, of the cross-bars arranged at right angles to each other and secured to the legs, a rotary shaft supported in bearings of said cross-bars and screwthreaded at its upper portion, adjusting nuts arranged on the threaded portion of the shaft, and a rotary platform secured to the lower end of the shaft, and comprising a flanged circular frame, and a disk carrying radial cutters, substantially as described.

2. The combination with the supporting legs, a stationary tank provided with radial partitions and crossed bars B and C, each of said bars having a central bearing, of a shaft supported in said bearings and threaded throughout a part of its length, adjusting nuts G and H arranged upon the shaft between the bars B and C, and a rotary platform secured to the lower end of said shaft, and consisting of a flanged circular frame, and a disk seated in said frame, and provided with radial cutters, substantially as described.

In testimony whereof I have signed this specification in the presence of two subscribing witnesses.

ANNIE C. COOK.

Witnesses:
HANS J. WINTHERLICH,
D. J. SELDEN.